V. T. & H. E. MOYS.
LIQUID DISPENSING DEVICE.
APPLICATION FILED JUNE 1, 1910.
1,009,550.
Patented Nov. 21, 1911.
2 SHEETS—SHEET 1.
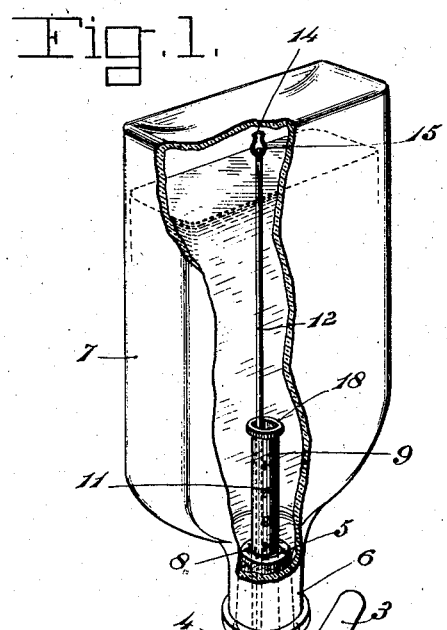
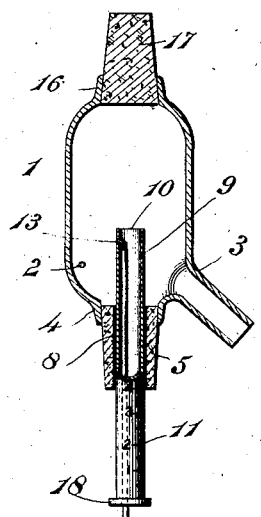
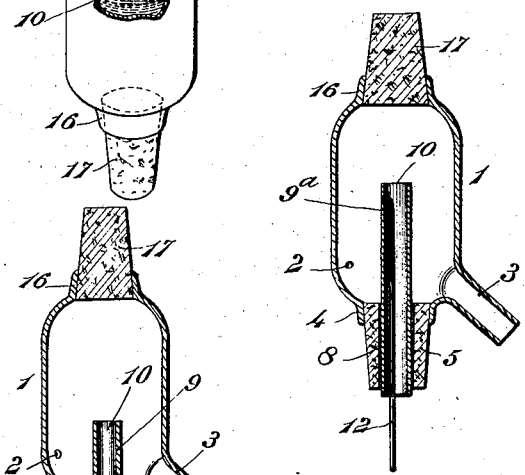
Witnesses
Harry King.
C. C. Hines.
Inventors
Vivian T. Moys and
Hubert E. Moys.
By Victor J. Evans
Attorney V. T. & H. E. MOYS.
LIQUID DISPENSING DEVICE.
APPLICATION FILED JUNE 1, 1910.
1,009,550.
Patented Nov. 21, 1911.
2 SHEETS—SHEET 2.
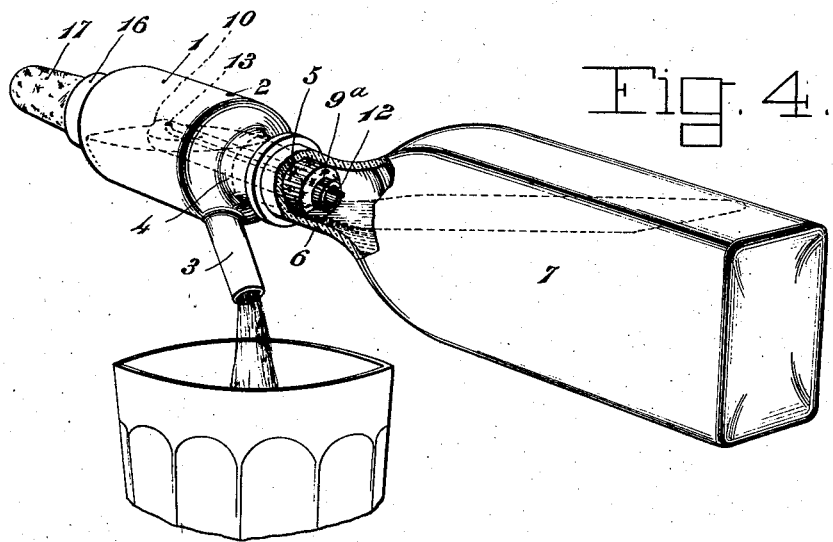
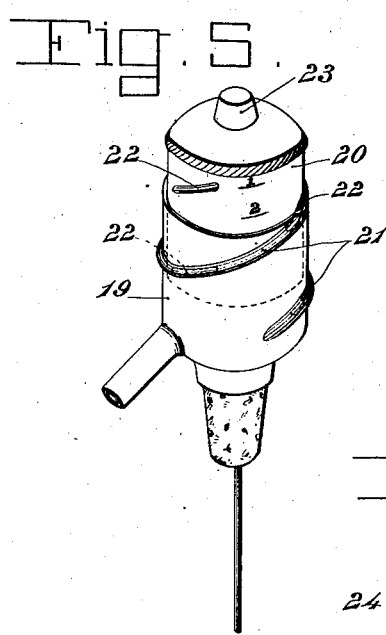
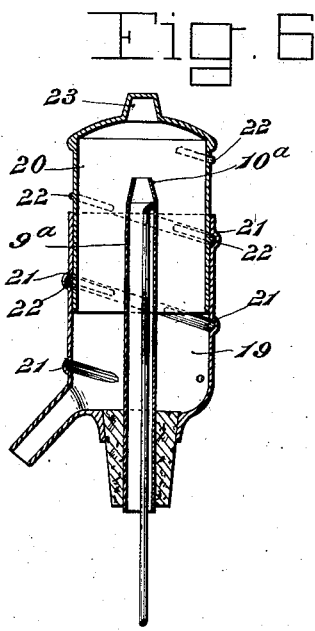
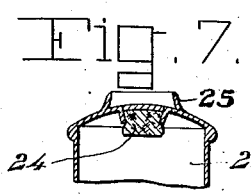

UNITED STATES PATENT OFFICE.

VIVIAN T. MOYS AND HUBERT E. MOYS, OF CRADOCK, CAPE COLONY.

LIQUID-DISPENSING DEVICE.

1,009,550. Specification of Letters Patent. Patented Nov. 21, 1911.

Application filed June 1, 1910. Serial No. 564,405.

*To all whom it may concern:*

Be it known that we, VIVIAN T. MOYS and HUBERT E. MOYS, subjects of the King of Great Britain, residing at Cradock, Cape Colony, South Africa, have invented new and useful Improvements in Liquid-Dispensing Devices, of which the following is a specification.

This invention relates to a liquid dispensing device for attachment to bottles, whereby a desired measured quantity of the liquid may be dispensed, the object of the invention being to provide a device of this character which is simple of construction, adapted for use in connection with bottles of different sizes, susceptible of being readily and conveniently cleaned, and operative to automatically cut off the flow of liquid when the proper amount is measured out, thus securing absolute accuracy in the measuring operation.

The invention consists of the features of construction, combination and arrangement of parts, hereinafter fully described and claimed, reference being had to the accompanying drawings, in which:—

Figure 1 is a perspective view of a bottle embodying the invention and inverted to measure a prescribed quantity of liquid for discharge, a portion of the air tube being omitted. Fig. 2 is a central vertical section of the distributer detached. Fig. 3 is a similar view of a modified form thereof, a portion of the air tube in this view also being omitted. Fig. 4 is a view showing the bottle tilted for discharge of the measured quantity of liquid, and illustrating a modified form of air inlet tube. Fig. 5 is a perspective view of another modified construction of distributer. Fig. 6 is a vertical section of the same. Fig. 7 is a detail view showing a still further modification. Fig. 8 is a view similar to Figs. 2 and 3, showing a form of distributer in which an air inlet tube is dispensed with.

Referring to the drawings, 1 designates a measuring vessel of cylindrical or other suitable form, said vessel being provided at one side near its base with an air inlet aperture 2 and at the opposite side of its base below the plane of said aperture with a downwardly projecting discharge nozzle 3. The bottom of the chamber is provided with a flaring or conical nipple 4 to receive and hold the upper enlarged end of a correspondingly shaped stopper 5. This stopper 5 is composed of cork or other suitable material and is adapted to fit within the neck 6 of the bottle 7 tightly to attach the device thereto and form an effective seal against leakage of the liquid contained in the bottle.

The stopper 5 is provided with a vertical passage which is lined by a metallic guide tube 8 in which is fitted to slide a conducting tube 9, hereinafter called the "admission" tube, for discharging the liquid from the bottle, said tube being adjustably mounted in the stopper so that its outer end 10 may be projected to a greater or less extent into the vessel 1. The lower end of the tube is provided with suitable graduations 11 adapted to be adjusted into registry with the base of the stopper so as to accurately position the tube for measuring out different quantities of the liquid. When the device is designed as an attachment for measuring bottles, the graduations may be arranged for measuring out any amount from a teaspoon to a tablespoon, more or less, but in the adaptation of the invention to large receptacles the graduations may be arranged in any suitable manner to measure out larger quantities.

Extending longitudinally through the admission tube 9 is an air outlet tube 12, which opens laterally at its outer end 13 through the upper end of the admission tube at the side opposite and above the air inlet opening 2 and below the tip 10 of said admission tube, the purpose of said tube 12 being to allow air to enter the bottle to take the place of the discharging liquid. Where the liquid is thin or the mouth of the bottle is sufficiently wide to permit air to enter while the liquid is flowing out, the tube 12 may be omitted, or with narrow-necked bottles extend but a short distance into the body of the bottle. If, however, the contents of the bottle are of a thick or syrupy character, the tube 12 is made of a length to extend downward to the bottom of the bottle and is provided at its lower end with an inlet 14 inclosing a check valve 15, which seats upwardly when the bottle is upright to prevent the liquid from entering the tube and is adapted to be unseated by the pressure of the air when the bottle is inverted to allow the air to flow into the bottom portion of the bottle left vacant by the liquid. Figs. 1, 2 and 3 disclose the use of a long valved air tube, Fig. 4, the use of a short air tube and Fig. 8 a construction omitting the air tube, as above described. The upper end of the vessel 1 is provided with a flaring nipple 16 adapted to receive and to be closed by a plug or stopper 17. When the device is used constantly it may be reversed after each use and the stopper inserted into the mouth of the bottle to close the same. At all other times the bottle is closed by its original stopper. The stoppers 5 and 17 are removably fitted so as to be easily renewed from time-to-time.

In the operation of the device thus far described, it will be understood that the tube 9 is adjusted to bring the desired graduation into registry with the base of the stopper 5 for positioning said tube to measure out the required amount, which operation may be conveniently accomplished by the provision of a flange or bead 18 upon the lower end of the tube serving as a finger grip. The end 10 of the tube will thus be projected to a greater or less extent into the vessel 1 to serve as a gage regulating the measuring distance between said end 10 and the upper end of the cup. The device is then applied to the bottle and the latter inverted, as shown in Fig. 1, causing liquid to flow from the bottle through the tube 9 into the inverted top of the vessel, which forms a measuring cup, air simultaneously entering the bottle through the tube 12 to take the place of the discharging liquid. The liquid will continue to flow from the bottle into the vessel until the outer end or cup portion thereof is filled up to the level of the mouth 13 of the air tube projecting through the admission tube, which tube will then be automatically sealed, thus cutting off the flow of liquid at the exact moment the required amount of liquid is measured out. By then tilting the bottle to the position shown in Fig. 4, in which the nozzle 3 is projected downwardly, the liquid will discharge through said nozzle into any suitable receptacle held below it, while air enters to take its place through the aperture 2. The device may then be removed and cleansed and stored away for future use, and the bottle closed by its closing stopper. In the absence of an air tube, as shown in Fig. 8, the cup will be filled to the level of the end of the discharge tube, which will thus be sealed. When it is desired to employ the dispensing device solely for the purpose of measuring out a fixed quantity of liquid at all times, the tube $9^a$ may be fixed within the stopper portion 5 to project the required distance into the vessel 1, as shown in Fig. 3, in which event the graduations 11, may, of course, be dispensed with.

In the modified form of our invention shown in Figs. 5 and 6 the measuring vessel 1 comprises two telescopic sections 19 and 20, the top section 20 being movable within the bottom section 19, and the admission tube $9^a$ is rigidly mounted in the stopper to maintain a fixed position, its upper or outlet end $10^a$ being contracted, as shown. The two sections 19 and 20 have a screw-threaded engagement to permit adjustment of the section 20 in and out, the section 19 being provided for this purpose with a continuous spiral groove or thread 21, while the section 20 is provided with a coacting spiral thread formed of separated portions 22, the groove and separated threads being loosely engaged so that said grooves will form said channels for the free passage of air into the device, the threaded engagement allowing the section 20 to be adjusted to regulate and register the distance between its top or outer end and the end $10^a$ of the admission tube, to regulate the effective depth of the measuring cup and consequently the amount of liquid which will be received therein up to the time the end of the admission tube is sealed and the flow cut off, as hereinbefore described. The top of the section 20 carries a conical cap 23 adapted when said section is adjusted inwardly to its fullest extent, to telescope over and close the end $10^a$ of the tube, by which the discharge of liquid will be prevented. This form of dispensing device may be used as a permanent attachment to the bottle, if desired, the cap 23 preventing evaporation of the contents. In the modified form shown in Fig. 7, the top of the section 20 carries a suitable inwardly projecting stopper 24 to close the end of the admission tube in a similar manner, and, as also shown, may be provided with a nipple or socket 25 to receive the bottle stopper 17, whereby the dispensing device may be inverted and the stopper 17 fitted within the bottle neck to tightly close the same.

From the foregoing description, taken in connection with the drawings, the construction and mode of use of our liquid dispensing device will be readily understood, and it will be seen that a device of this kind is provided which embodies the several advantages hereinbefore set forth and provides a device which may be readily and conveniently cleaned after use and which insures accuracy in measuring out a desired quantity of liquid.

By the use of the words "upwardly", "upper", "lower" and the like, in the claims, it will be understood that we mean the arrangement of the parts referred to with respect to the bottle or passage when the latter is disposed in a normal upright position.

Having described our invention, we claim:—

1. A liquid dispensing device comprising a vessel having a lateral outlet at its lower end, and an admission tube extending upwardly into the vessel through the lower end thereof to a point above said outlet, the portion of the vessel above the upper end of said tube forming a measuring cup, said tube and cup being relatively adjustable to vary the effective measuring capacity of said cup.

2. A liquid dispensing device comprising a vessel having a lateral outlet at its lower end, and an admission tube extending upwardly into the vessel through the lower end thereof to a point above said outlet, the portion of the vessel above the upper end of said tube forming a measuring cup.

3. A liquid dispensing device having a lateral outlet at its lower end, and an admission tube extending upwardly into the vessel through the lower end thereof to a point above said outlet, the portion of the vessel above the upper end of said tube forming a measuring cup, the vessel also having an air inlet at its side diametrically opposite said outlet and below the level of the top of the tube.

4. A liquid measuring device comprising a vessel having a lateral outlet at its lower end and an air inlet opposite said outlet, a stopper closing the lower end of the vessel and adapted to be fitted into the neck of a receptacle, and a liquid admission tube extending upwardly through said stopper into the vessel to a point above said lateral inlet, the portion of the vessel above the upper end of said tube forming a measuring cup.

5. A liquid measuring device comprising a vessel having a lateral outlet at its lower end and an air inlet opposite said outlet, a stopper closing the lower end of the vessel and adapted to be fitted into the neck of a receptacle, and a liquid admission tube extending upwardly through said stopper into the vessel to a point above said lateral outlet and air inlet, the portion of the vessel above the upper end of said tube forming a measuring cup.

6. A liquid dispensing device comprising a vessel having a lateral outlet at its lower end and an air admission opening opposite said outlet, a stopper at the upper end of said vessel and projecting therefrom, a stopper at the lower end of the vessel, and a liquid admission tube extending upwardly into the vessel through the lower stopper to a point above the level of the outlet and air opening, the portion of the vessel above the upper end of said tube forming a measuring cup.

7. A liquid dispensing device comprising a vessel having a lateral outlet at its lower end and an air inlet opposite said outlet, a stopper at the lower end of said vessel, and a liquid admission tube extending through and slidably mounted in said stopper, said tube projecting upwardly into the vessel to a point above the level of the lateral outlet and air inlet and provided with graduations to indicate its extent of adjustment into said vessel, the portion of the vessel above the upper end of said tube forming a measuring cup.

8. A liquid dispensing device comprising a vessel having a lateral outlet at its lower end and an air inlet opposite said outlet, a liquid admission tube extending upwardly into the vessel through the lower end thereof to a point above said outlet, the portion of the vessel above the upper end of said tube forming a measuring cup, and an air tube arranged within said admission tube and having its upper end opening laterally through said admission tube at a point adjacent the upper end thereof.

9. A liquid dispensing device comprising a vessel having a lateral outlet at its lower end and an air inlet opposite said outlet, a liquid admission tube extending upwardly into the vessel through the lower end thereof to a point above said outlet and air inlet, the portion of the vessel above the upper end of said tube forming a measuring cup, an air conducting tube arranged within and extending downwardly through said admission tube, said conducting tube opening laterally at its upper end through the admission tube at a point adjacent the upper end thereof and provided at its lower end with a valve casing, and a valve arranged in said casing for closing said tube when the vessel is inverted.

In testimony whereof we affix our signatures in presence of two witnesses.

VIVIAN T. MOYS.
HUBERT E. MOYS.

Witnesses:
  Edw. Hawood,
  J. W. Simbridg.